Aug. 13, 1957 L. G. SYMONS 2,802,571
TENSIONED PANEL SCREEN DECK
Filed March 9, 1953 6 Sheets-Sheet 1
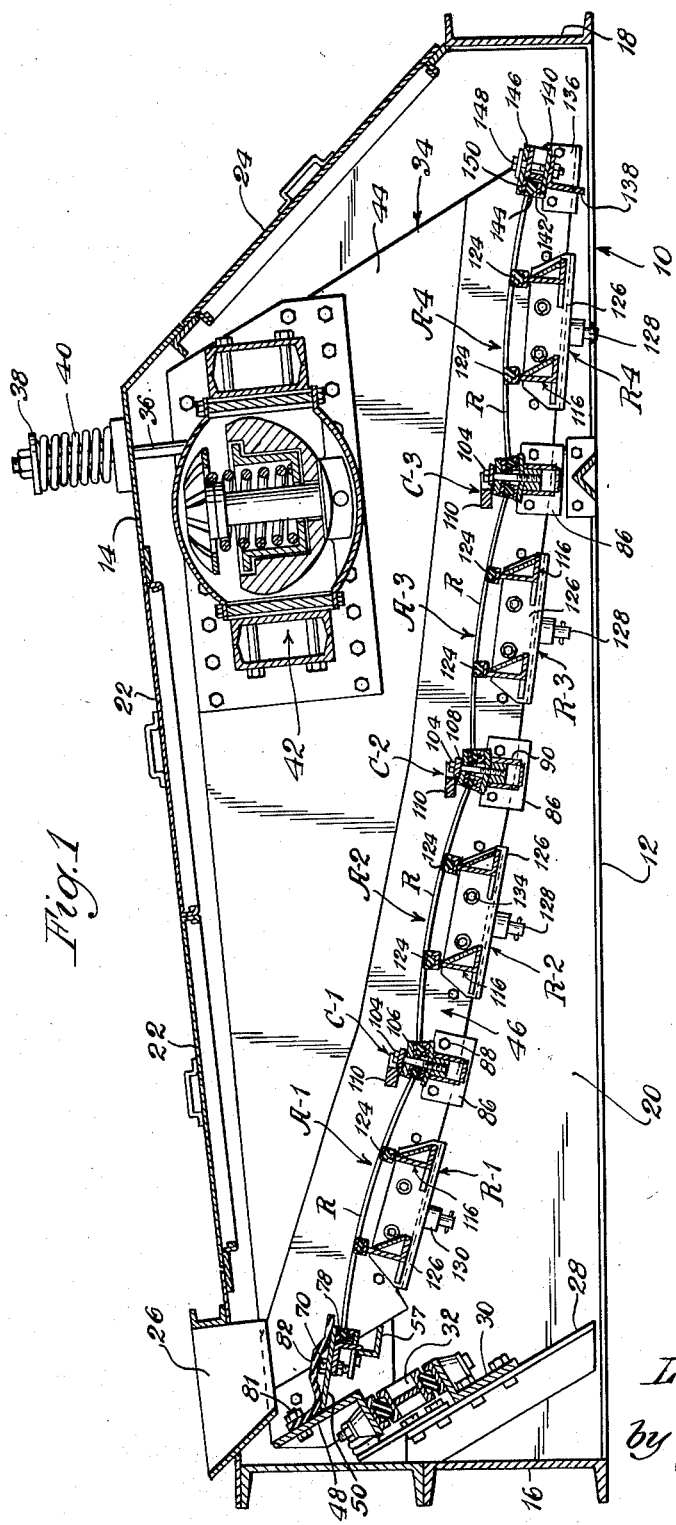
Inventor
Loren G. Symons
by Parker & Carter
Attorneys

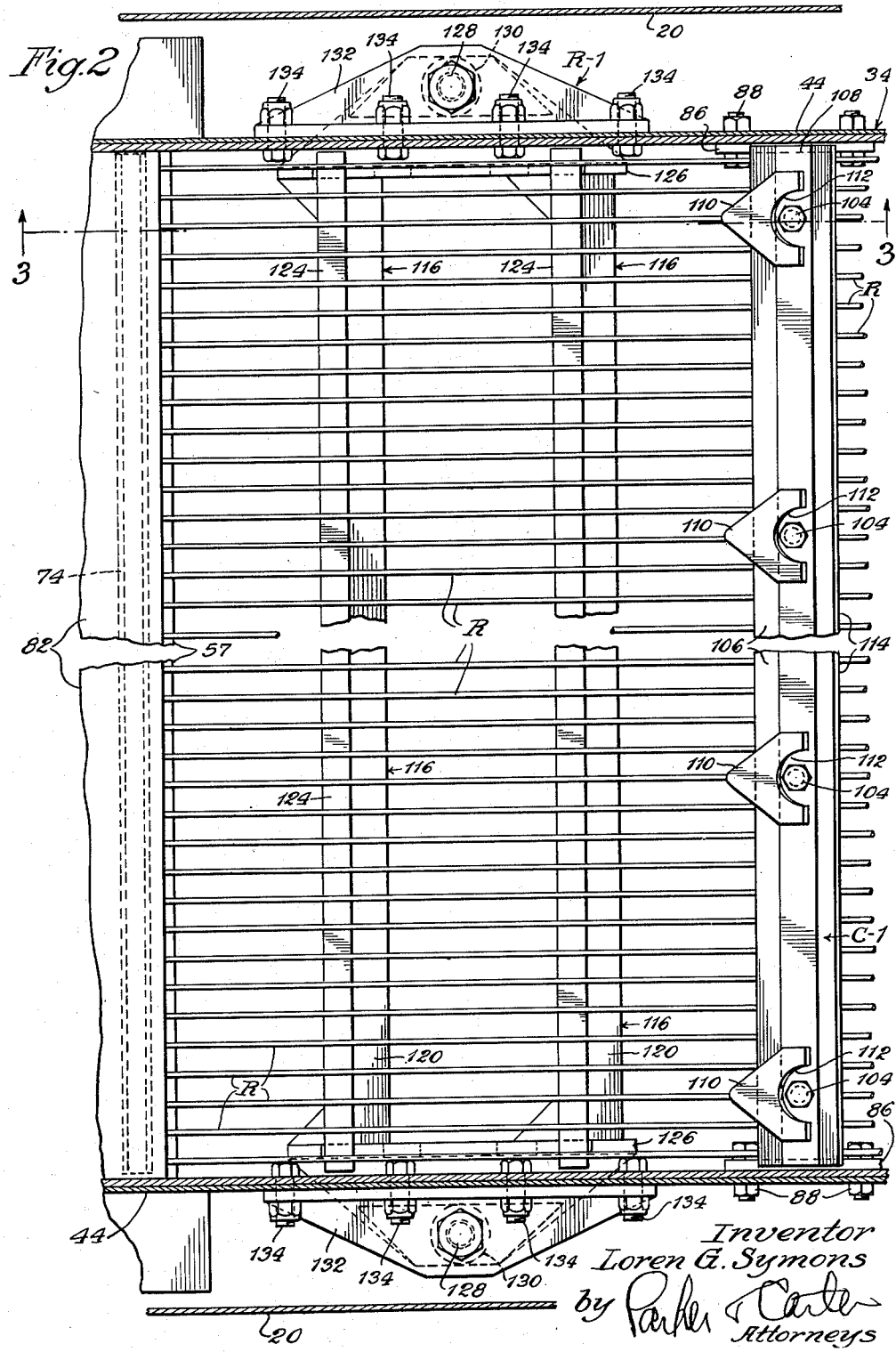

Aug. 13, 1957 L. G. SYMONS 2,802,571
TENSIONED PANEL SCREEN DECK
Filed March 9, 1953 6 Sheets-Sheet 3
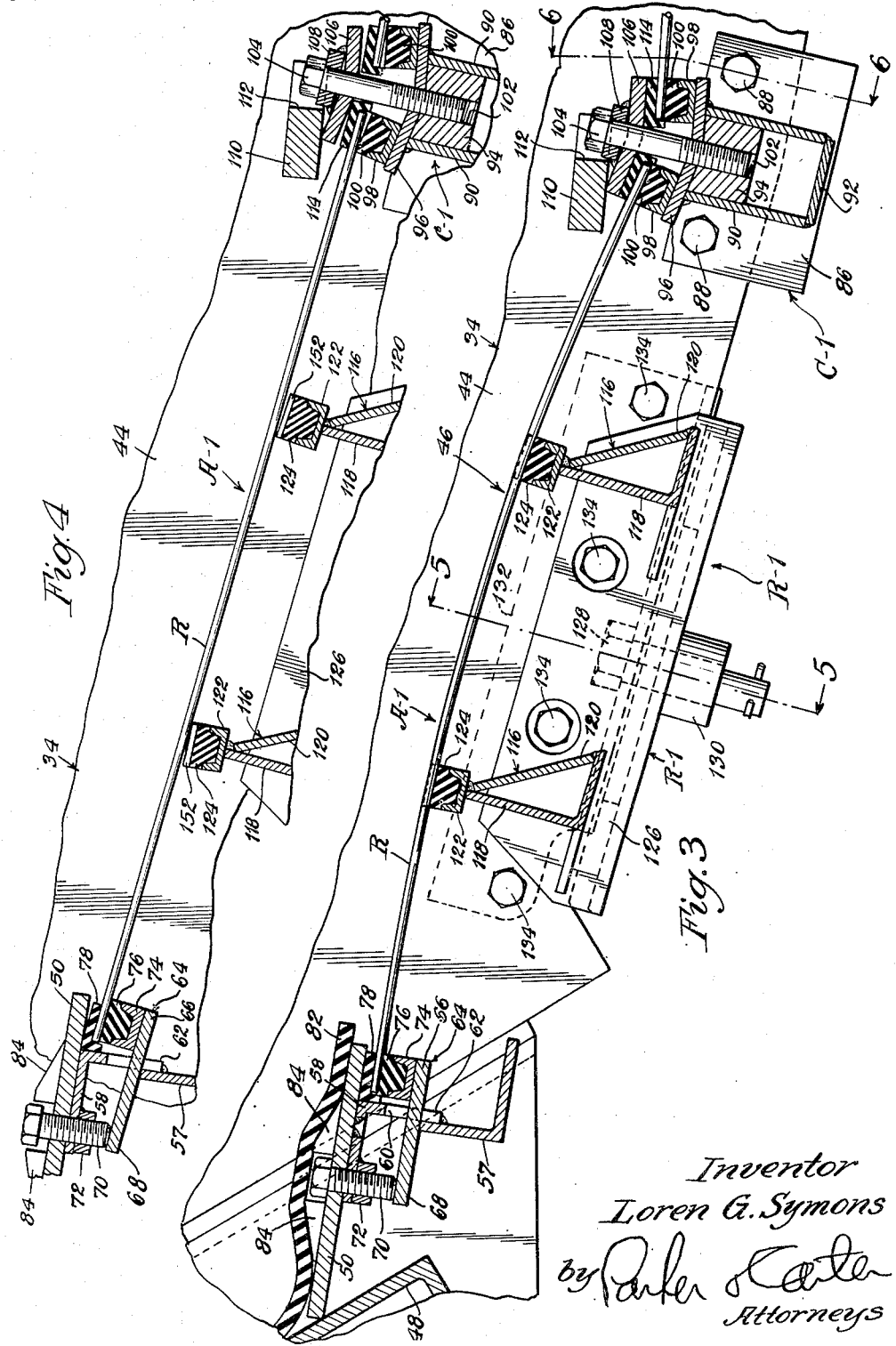
Inventor
Loren G. Symons
by Parker Carter
Attorneys

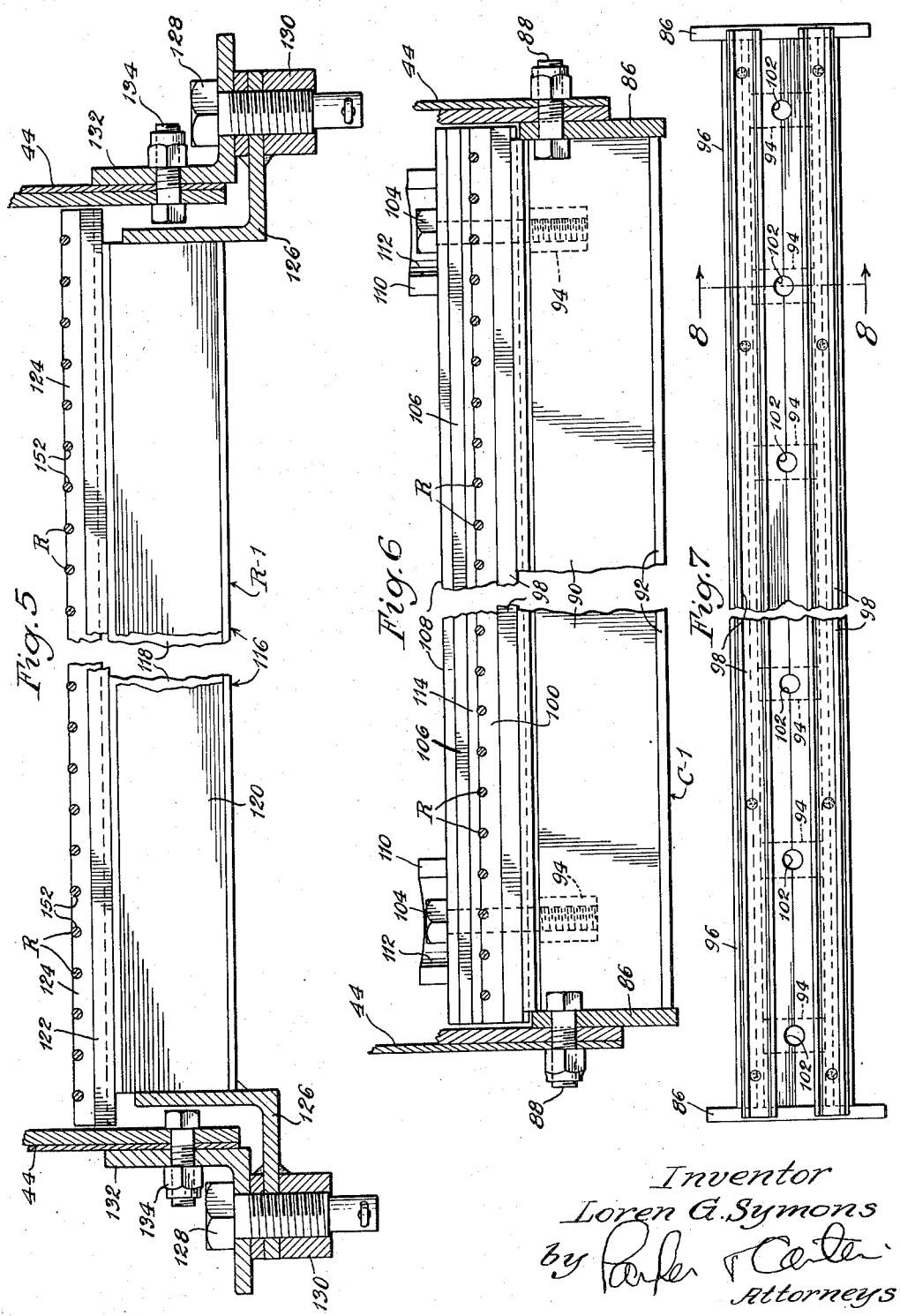

Aug. 13, 1957  L. G. SYMONS  2,802,571
TENSIONED PANEL SCREEN DECK
Filed March 9, 1953  6 Sheets-Sheet 5
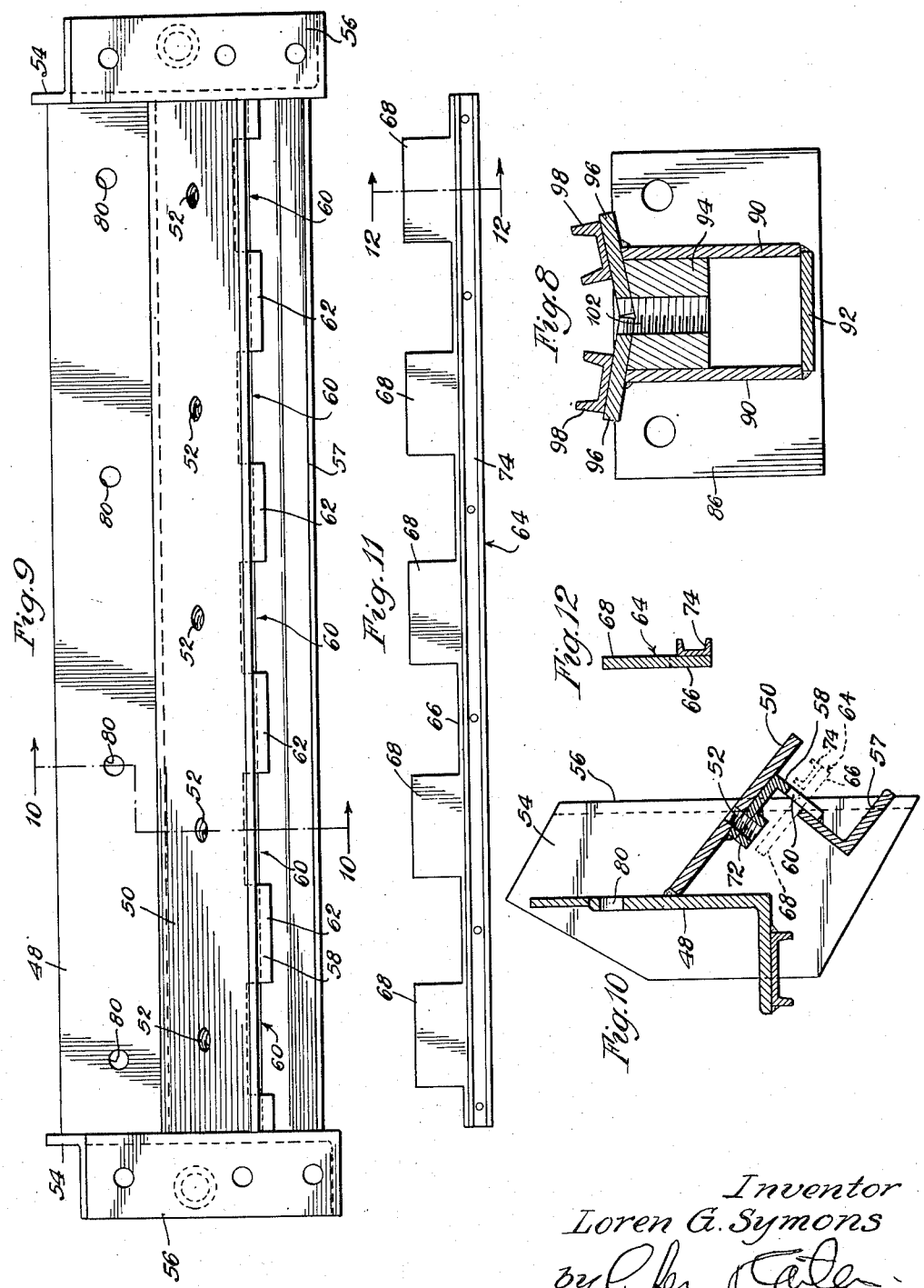
Inventor
Loren G. Symons
by Parker
Attorneys

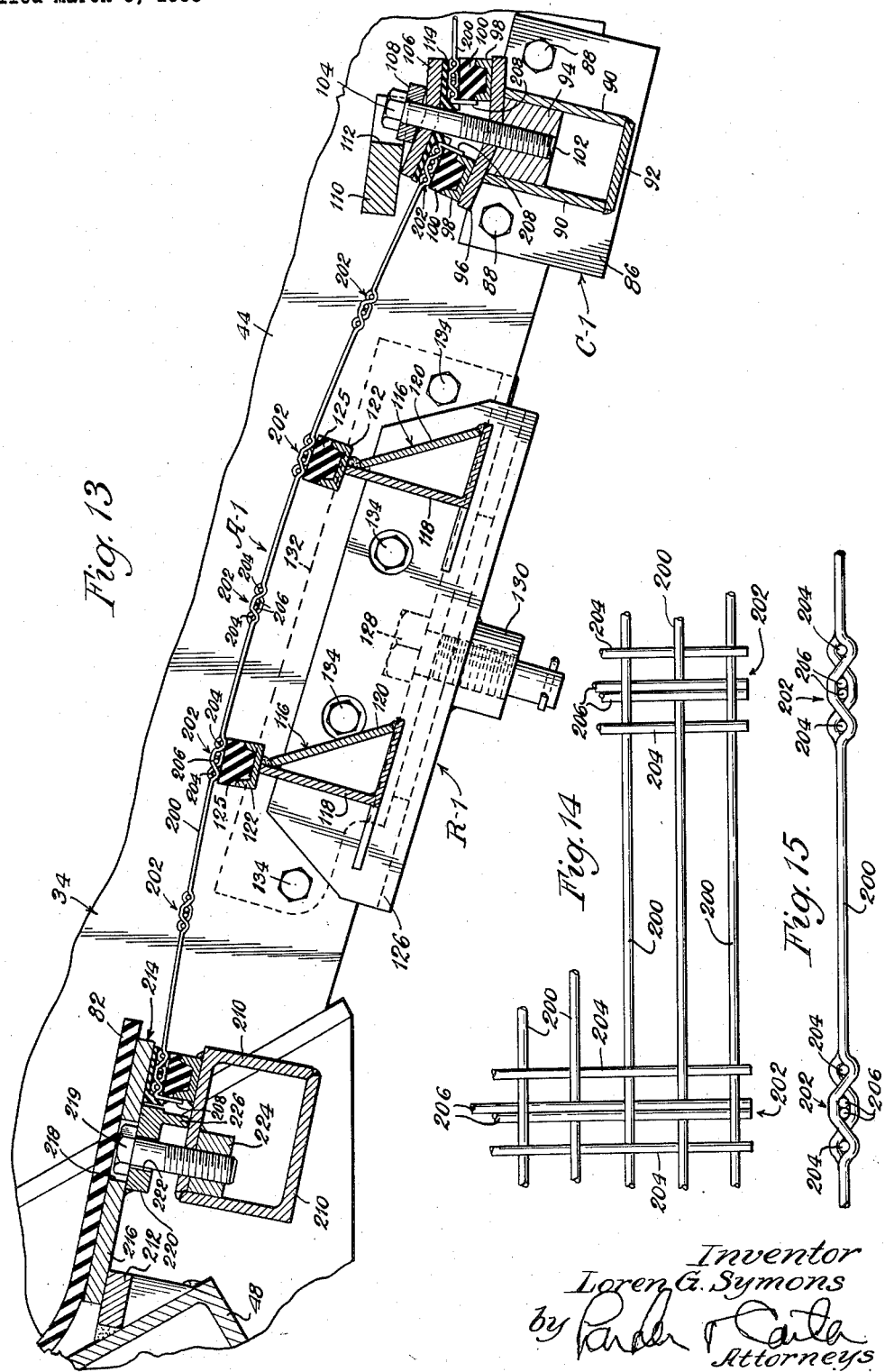

United States Patent Office 2,802,571
Patented Aug. 13, 1957

2,802,571

TENSIONED PANEL SCREEN DECK

Loren G. Symons, Hollywood, Calif., assignor to Nordberg Manufacturing Company, Milwaukee, Wis., a corporation of Wisconsin Application March 9, 1953, Serial No. 341,131

7 Claims. (Cl. 209—394)

My invention resides in the field of screens, particularly vibrating screens, wherein materials under various conditions are passed over a vibrating screen surface so that the material will be separated according to the openings in the screen surface.

The present invention has for a primary object a new and improved screen deck with an appropriate vibrating mechanism and an enclosing housing whereby the materials to be screened will be properly funneled, guided and subjected to the vibrating screening action of the screen deck.

Another object of my invention is a screen deck with a mechanism for providing tension by arching and flexing the screening medium to a desired degree of arch.

Another object of my invention is a screen deck composed of a plurality of longitudinally disposed rods and a mechanism for arching or flexing the rods into a desired degree of arch to provide the proper tension in the screen deck.

Another object of my invention is a screen deck with clamping and flexing mechanisms adapted to accommodate and suitably tension what might be termed smaller sized rods.

Another object of my invention is a suitable clamping mechanism for preventing the rods from coming loose in their mountings in the screen deck.

Another object of my invention is means for tensioning the screening medium in the screen deck, as well as clamping it.

Another object of my invention is a new and effective screening cloth adapted to be clamped and suitably flexed in the screen deck.

Other objects will appear from time to time in the ensuing specification and drawings, in which:

Figure 1 is a longitudinal sectional view of my new and improved screening mechanism showing the screen deck in the screen housing;

Figure 2 is a plan view partly in section, of one of the screen sections shown in Figure 1;

Figure 3 is a sectional view on an enlarged scale, taken along line 3—3 of Figure 2 illustrating the head end of the screen deck in Figure 1;

Figure 4 is the same as Figure 1 or 3 with the screening medium in a different position of adjustment or flexure;

Figure 5 is a sectional view taken along line 5—5 of Figure 3;

Figure 6 is a sectional view taken along line 6—6 of Figure 3;

Figure 7 is a detail top view of a portion of the intermediate clamping and supporting mechanisms shown in Figure 3;

Figure 8 is a sectional view taken along line 8—8 of Figure 7;

Figure 9 is a plan view of the detail of the head end mechanism;

Figure 10 is a sectional view taken along the line 10—10 of Figure 9;

Figure 11 is another detail of a portion of the head end mechanism;

Figure 12 is a sectional view taken along line 12—12 of Figure 11;

Figure 13 is a sectional view similar to Figure 3 showing a modification of the present invention; and Figures 14 and 15 are detail views of the screening medium or screening cloth used in the modification of Figure 13.

In Figure 1 my screening mechanism is composed primarily of an outer housing 10 which has a base surface 12, a top surface 14, end walls 16 and 18, and side walls 20. The top surface 14 may be provided with suitable openings or accesses which have any conventional form of removable cover 22. End wall 18 likewise has an appropriate opening with a suitable cover 24, the wall having an inclined portion which is disposed at approximately 45 degrees to the horizontal. The outer housing 10 has at its upper left corner a feed box or hopper 26 which is appropriately adapted to receive the material which is to be screened. The outside of the housing may be provided with any suitable and appropriate reinforcing and bracing structure which I have not shown in detail as it forms no part of the present invention.

The inner faces of the side walls 20 are provided with suitable angles 28 which are bolted or otherwise appropriately secured thereto. A transversely disposed supporting angle 30 is positioned between and suitably secured to the angles 28 and carries on its upper surface a resilient element 32 which is adapted to yieldingly support one end of a vibrating or inner housing, indicated generally at 34.

For the details of this or a similar resilient element, reference is made to U. S. Patent Nos. 2,299,661 and 2,308,572, as the detailed structure of this element forms no part of the present invention.

While one end of the inner vibrating housing 34 is supported by the resilient element 32, the other end may be supported, for example, by a pair of tension members or rods 36, one of which may be located on each side of the inner housing, each rod having an upper washer 38 and a coil spring 40 compressed between the washer and the top surface 14 of the housing.

Any suitable vibration-producing means, which does not of itself form part of the present invention, is indicated at 42 and will not be described in detail. It will be understood, however, that 42 indicates an unbalanced rotor, which may be rotated by any suitable motor not herein shown, whereby vibration is imparted to the inner housing.

As all of the previous mechanism is considered conventional and does not form a specific part of the invention, it has been described only generally. For additional information on this or similar structure, attention is directed to U. S. Patent Nos. 2,192,278, 2,316,725 and 2,321,166.

The inner vibrating housing 34 is composed primarily of a pair of deck sides 44, each extending parallel to and spaced slightly inwardly from the side walls 20 of the outer housing. The deck sides are connected along their lower edge by a rod deck or screening surface 46 which extends from a point at the upper left in Figure 1 adjacent the food hopper 26 down to the lower right so as to be diagonally disposed within the outer housing. It will be understood that the material to be screened or separated is deposited on the upper left end of the rod deck 46 through hopper 26 and travels downwardly to the right, during which travel it is subjected to the vibrating action of the inner housing as imparted thereto by the vibration-producing means 42.

The screening mechanism of the deck can be composed of any suitable screen structure, and in Figures 1 and 2

I have shown a plurality of closely spaced, longitudinally disposed rods R.

At the upper left end of the vibrating housing 42 an angle 48 is suitably secured between the deck sides, the lower leg of the angle being appropriately connected to the resilient element 32. A plate 50 is welded or otherwise suitably secured to the angle 48 and is provided with an appropriate aperture 52. As shown in Figure 10, the angle 48 and plate 52 are suitably secured, as by welding, to a pair of plates 54 which, as shown in Figure 1, are appropriately connected to the forward edge of the deck sides. As shown, the plates 54 have flanges 56, which are positioned flush against a corresponding flange on the forward edge of the deck sides, these flanges being appropriately bolted or otherwise suitably secured together.

In Figures 9 and 10 the head end structure is shown as a separate removable unit and is composed of the plates 54, and angles 48 and the plates 50 positioned therebetween. A reinforcing angle 57 is welded, or otherwise suitably secured, between the plates 54 and is connected at its upper end to an angle 58 which is welded or otherwise suitably secured to and depends from the plate 50. As shown in Figure 9, the angle 58 is provided with equally sized slots 60 which are spaced across the depending leg thereof. These slots 60 form the lower edge of the angle 58 into a plurality of legs 62 which are suitably secured to the reinforcing angle 57, thus providing equally spaced openings to receive the rod-clamping member 64, shown in dotted lines in Figure 10. This clamping member has a main body portion 66 and a plurality of equally sized tabs or legs 68 which are adapted to fit through the slots formed in angle 58. Note this relationship is shown in Figures 9 and 10. The tabs 68 are engaged and actuated by an equal number of bolts 70 which project through the apertures 52 in plate 50, the lower side of the apertures being provided with nuts 72 which are welded thereto. Thus the bolts 70 tend to rotate or pivot the clamping member 64 about the upper edge of the reinforcing angle 57 when positioned through the openings formed by the slots 60. In Figure 10 clamping member 64 is provided along its body portion 66 with a channel member 74 which extends the full length thereof and moves toward the underside of the plate 50 when the tabs 68 are moved downwardly by the bolts 70. In Figure 3 the channel member 74 has a resilient element 76 which is adapted to clamp the upper ends of the rods R. The undersurface of the plate 50 is provided with a rubber strip 78 or any suitable resilient piece so that metal to metal contact is prevented.

Angle 48 is apertured at 80 in Figure 10 so as to receive a plurality of suitable bolts 81 which serve to secure a suitable rubber mat or blanket 82 thereto. The heads of bolts 70 may be protected by a pair of wedge-shaped members 84 which are permanently or removably secured to the upper surface of plate 50.

As shown in Figure 1, the material being fed down through the feed hopper 24 will first contact the mat 82 which protects the bolts 70 and plate 50 and the material then moves downwardly to the right across the screen deck.

The rod deck 46 is composed of a plurality of sections A-1, A-2, A-3 and A-4, each section being substantially identical, with the exception of the head end and the foot end. Each section is composed of a plurality of rods which are equally spaced transversely across the surface of the deck. The rods R are clamped as a unit at either end and flexed upwardly in the middle, otherwise they have a tendency to become loose or unsteady in their disposition in the rod deck, to the point of coming completely out of their supporting mechanism. As shown in Figure 1, clamping mechanisms C-1, C-2 and C-3 reside between the rod sections and clamp the ends of the rods. The first rod section A-1 has its upper end clamped by the head end structure shown and described in Figures 9 and 10. The last rod section, in this case A-4, has a foot end mechanism which clamps and holds the ends of the rods in that section, and which will be described subsequently. In each of the rod sections, after the rods have been clamped at each end, they are flexed or arched upwardly by a flexing or arching mechanism, designated generally R-1, R-2, R-3 and R-4 in Figure 1.

As all of these various units are substantially identical, only one of each will be described in detail, and where differences exist, they will be noted; however, it will be understood that each of the various types of units is substantially identical.

As shown in Figure 3, the clamping mechanism C-1 is composed of a pair of side plates 86, each being secured to a deck side at 88. A pair of vertically disposed plates 90 are closed along their lower edges by a horizontally disposed plate 92, which is welded or otherwise suitably secured in position. A plurality of blocks or supporting members 94 are positioned between the plates 90 and carry along their upper edges a pair of diagonally disposed plates 96. Each of these plates 96 has a channel member 98 welded or otherwise suitably secured to its upper surface, plates 96 being angularly disposed or offset with relation to the plates 90. Each of the channels 98 supports a rubber strip resilient piece 100 which bears against the underside of the ends of the rods. The plates 96 are joined together along their inner edges by welding or any other appropriate means, and they as well as the blocks 94 are suitably apertured and threaded, as at 102, to receive a plurality of spaced clamping bolts 104 in Figure 3. A clamping bar 106 is positioned so as to override the ends of the rods and is suitably apertured to receive the shank of each of the bolts 104. The clamping bar is made up of a pair of plates which are joined at their inner end and slightly angularly disposed with relation to each other so as to be substantially parallel to the angularly disposed plates 96. A reinforcing bar 108, apertured along its length to receive bolts 104, is provided on the upper surface of the clamping bar 106 and extends the full length thereof, as shown in Figure 2. A plurality of bolt headguards 110 are secured to the upper surface of this clamping mechanism and, as shown in Figure 2, each has an arcuate slot 112 in its rear portion so as to provide access to the bolt heads. These guards serve to protect the heads of the bolts so that they will not become mutilated and disfigured by contact with the material moving over the screen deck. The undersurface of the clamping bar 106 is provided with resilient or rubber strips 114 to prevent metal to metal contact with the rods. Thus, when the bolts 104 are screwed downwardly into the beam 94, the clamping bar 106 is drawn downwardly so as to firmly secure the ends of the rods between the resilient or rubber elements 100 and 114. With the clamping mechanism raised, the rods can be inserted between the resilient elements, as shown in Figure 4, where they are securely clamped while they are substantially horizontal or unflexed. While I have referred to the clamping mechanism C-1, as shown in Figure 3, it should be understood that the other clamping mechanisms are substantially the same.

Each of the intermediate flexing or arching mechanisms is composed of a pair of transverse supports 116 composed of an angle 118 and a diagonally disposed plate 120. The upper edge of the support carries a channel 122 which receives a rubber strip or resilient piece 124, this strip being adapted to engage and flex the rods. The supports 116 extend between a pair of brackets 126, as shown in Figure 5, each of which has a lower leg that extends outwardly under the edge of the deck side 44. This outwardly extending leg is apertured so as to receive a cap screw 128, a boss 130 being also suitably secured to the bracket and appropriately apertured and threaded so as to engage and coact with the cap screw 128. This entire mechanism is removably attached to the deck sides by brackets 132 which are suitably secured thereto by any conventional means, such as bolts 134. As shown in Figure 5, these brackets 132 have outwardly extending legs which are apertured to receive the upper end of cap screws 128. The apertured leg of each of the brackets 132 is not threaded and the cap screws will only rotate therein.

The threaded shank of the cap screw 128 is screwed into the boss 130 and rotation of the cap screw causes the boss and bracket 126 to walk up and down the shank of the bolt, thus raising and lowering the intermediate supports 116.

While I have shown and described only the first flexing or arching mechanism R–1, it should be understood that the others, namely R–2, R–3, and R–4, are substantially the same.

The mechanism for holding the foot end of the rods in section A–4, the last section, is composed of a pair of side plates 136 which are bolted or otherwise suitably secured to each of the deck sides. Extending between these plates is an angle 138 which is suitably connected to each of the plates. The horizontally disposed leg of the angle 138 has a flat plate 140 secured thereto, this plate having on its forward edge a channel member 142. This channel holds a rubber or resilient support 144 which is apertured to hold and space the ends of the rods in the section A–4. A clamping plate 146 and a suitable number of bolts 148 are disposed above plate 140 and serve to clamp the ends of the rods into the rubber support, a rubber strip 150 being provided along the forward underedge of the clamping plate 146 to prevent metal to metal contact.

Figures 13 through 15 show a modification of the invention which is similar to the structure shown in Figure 3 in that the clamping and flexing mechanism is substantially the same, the difference being in the particular medium used to screen the material. In this modification a series of small wires are used in place of the rods and are formed as a woven wire cloth or closer knit mesh or screen so as to present smaller openings. In Figure 14 the wires 200 are shown as being equally spaced transversely across the screen deck and are provided with groups 202 transversely disposed interwoven wires so as to form, in effect, a wire cloth. In Figure 15 the transverse groups 202 are formed with four wires to a group. In each group the two outside wires 204 are placed alternately over and under the longitudinal wires 200 so that they both pass under and over the same wire. The two inside wires 206, in a group, are positioned directly adjacent each other and pass together alternately over and under the longitudinal wires but are oppositely disposed with relation to the outside wires 204. Thus, the inside wires are symmetrically opposite to the undulating contour of the outside wires. In Figure 13 each section of wire cloth as a group 202 of transverse wires positioned directly over each of the intermediate resilient supports, as well as the resilient end supports. In addition a group 202 is positioned directly between each of the resilient supports, with each group being equally spaced from its adjacent groups. In addition, a small portion 208 of the longitudinal wires 200 extends beyond the end resilient supports in the clamping mechanism and is turned down so that the ends of the wire cloth are, in effect, hooked over the end supports.

The clamping and arching mechanisms are the same except for the head end which is composed of primarily a pair of angles 210 which are disposed in a rectangular formation and welded or otherwise suitably secured together at their ends so as to form a hollow transverse supporting member which is secured to the deck sides. Angle 48 has a triangular shaped block 212 welded or otherwise suitably secured to its upper face so as to serve as a supporting means for a head end clamping mechanism 214. This clamping mechanism includes a transversely disposed plate 216 which is suitably apertured at 218 across the width of the inner frame 34. The underside of the plate has a member 220 which is suitably secured thereto by any conventional means. This member is also apertured as at 222 so as to receive the shank of a plurality of bolts 219, the apertures 218 in plate 216 being large enough to completely receive the heads of the bolts so that the tops of the bolt heads are flush with or below the upper surface of the plate. The bolt extends through the angle 210 and is threaded into a block 224 which is welded on the inside of the main supporting members formed by angles 210. Member 220 has a depending plate 226 which acts as a stop against angle 210. The rubber blanket 82 is used in the same manner as described with reference to Figure 1.

Thus, the wire cloth is positioned between the two end supports while the intermediate arching mechanism is in its lower position, with the depending portions 208 thereof hooked over the ends of the resilient elements. While in this position, the ends are clamped at the head end by turning down on the bolts 219 and, when properly secure, the arching mechanism is raised until the desired degree of arch is acquired. As in the previous modification, the ends of the screening medium are securely clamped prior to flexing so that it will not come out of the section during operation. It should be noted that the screen mesh is placed under some tension due to the arch placed therein by the arching mechanism.

The use and operation of my invention are as follows:

The rods used in this type of screen deck are what might be termed the smaller and more flexible type and the problem of retaining them within their supports after they have been flexed is solved by clamping the rods at each end prior to flexing so that the ends of the rods will not come out of the various rubber elements after they are flexed by the arching mechanism. The rods themselves are not stiff enough to maintain their arched condition, unless they are clamped at their ends. The procedure of inserting the rods and arching the same requires that the center support of the arching mechanisms be dropped into the lower position by rotation of the cap screws and the rods are clamped at their ends, as shown in Figure 4, in a straight position, and then the arching mechanisms are raised upward by the outside cap screws, thus arching the rods to the desired degree. The head end is clamped by turning down on the screws 70, which causes the member 64 to pivot about the angle 57 to raise the rubber strip 76. The foot end of the rods in section A–4 are tightened adequately by turning down on bolt 148. The ends of the rods intermediate the head and foot ends are clamped and held in position by turning down on the bolts 104 on the intermediately clamping mechanisms C–1, C–2 and C–3.

As shown in Figure 2, the rods are equally spaced transversely across the rod deck and are held in their spacing by longitudinal slots 152 formed in the intermediate resilient elements 124, these slots being in all of the intermediate rubber strips 124 as well as the rubber strips of the end clamping mechanism and the head and foot ends.

By clamping the rods at each end and flexing them up in the middle, they are placed under a certain amount of tension.

In the modification of Figures 13 through 15 the arching and clamping mechanisms are substantially the same but are used with a different screening medium, a woven wire mesh or cloth which includes a plurality of longitudinally disposed wires with transverse wire sections interwoven therein. The precise positioning of the wire sections over the resilient elements is the result of the equal spacing therebetween with one transverse wire group residing between each of the supports. The resilient elements 125 in this modification do not have the grooves or slots therein as do the ones 124 in Figures 4 and 5 which receive the rods. The grooves from the resilient elements can be removed, as the spacing between the longitudinal wires is maintained by the woven cross wire groups. The turned down portions 208 of the longitudinal wires serve to hook the wire mesh over the end supports.

In both modifications the cap screws that serve to actuate the intermediate arching mechanism are accessible from the outside of the deck sides in the space between the sides and the main housing. They can be reached by the use of a long socket wrench which is inserted downwardly between the two members and removed.

Whereas I have shown and described a preferred form of my invention and one modification, it should be understood that numerous modifications and alterations can be made without departing from the fundamental theme. For example, I have shown in Figure 1 four screen sections; however, any number could be used without departing from the spirit of my invention, and I do not intend to be limited to any specific number of sections. In the embodiment of Figures 1–12, I do not wish to be limited to a particular size of rods even though it is understood that the unit is designed to accommodate what might be termed the smaller or more flexible rods, however, larger rods could be used. In addition the screening mediums from one section to another could vary in screening intensity so that various sizes of material would be screened by the different sections. I have described the unit with reference to no particular material as conventional modifications could be made to adapt the unit for almost any type of use. With these modifications and alterations as well as many other in mind, which are obvious, I desire that my invention be unrestricted except by the appointed claims.

I claim:

1. A vibrating screen deck structure including side frame members and a transverse connecting screen deck, said deck being composed of plurality of screen sections, each section including a screening medium, tensioning mechanism for tensioning said medium into a predetermined tensioned condition, said mechanism including means for securing the ends of the screening medium while it is in a flat, non-tensioned condition, and an intermediate supporting and tensioning mechanism extending between and adjustably connected to the side frame members to upwardly tension the screening medium, said last named mechanism being positioned intermediate said end-securing means and mounted for movement between said side frame members along a path of a length sufficient to move said medium into a position out of alignment with said end-securing means.

2. The structure of claim 1, wherein the screening medium includes a plurality of longitudinally extending relatively flexible rods.

3. The structure of claim 1, wherein said medium includes a woven wire cloth.

4. The structure of claim 3, wherein the ends of said woven wire cloth grip said end securing means.

5. In a screening mechanism a base, a supporting housing mounted on said base, a screen deck structure resiliently mounted on said housing, vibrating mechanism mounted on said housing and associated with said screen deck structure for vibrating same, said deck structure including side frame members and a transverse connecting screen deck, said deck being composed of transverse connecting members extending between the side frame members and a plurality of screen sections, each screen section including a screening medium, a tensioning mechanism for tensioning said medium into a predetermined tensioned conidtion, said mechanism including means for securing the ends of the screening medium while it is in a flat, non-tensioned condition, and an intermediate support extending between and adjustably connected to the side frame members to upwardly tension the screening medium after the ends have been secured, said support having portions in contact with ports of the lower surface of said medium, said support portions being movable into position above the plane occupied by said end-securing means to arch said medium, and manually operable means positioned between the side frame members and the housing and associated with said support for actuating it.

6. The structure of claim 5, wherein said medium includes a plurality of longitudinally extending relatively flexible rods.

7. The structure of claim 5, wherein said medium includes a woven wire mesh.

References Cited in the file of this patent
UNITED STATES PATENTS

| | | |
|---|---|---|
| 810,682 | Shafer | Jan. 23, 1906 |
| 2,308,572 | Symons | Jan. 19, 1943 |
| 2,456,075 | Newhouse | Dec. 14, 1948 |